United States Patent Office 3,347,604
Patented Oct. 17, 1967

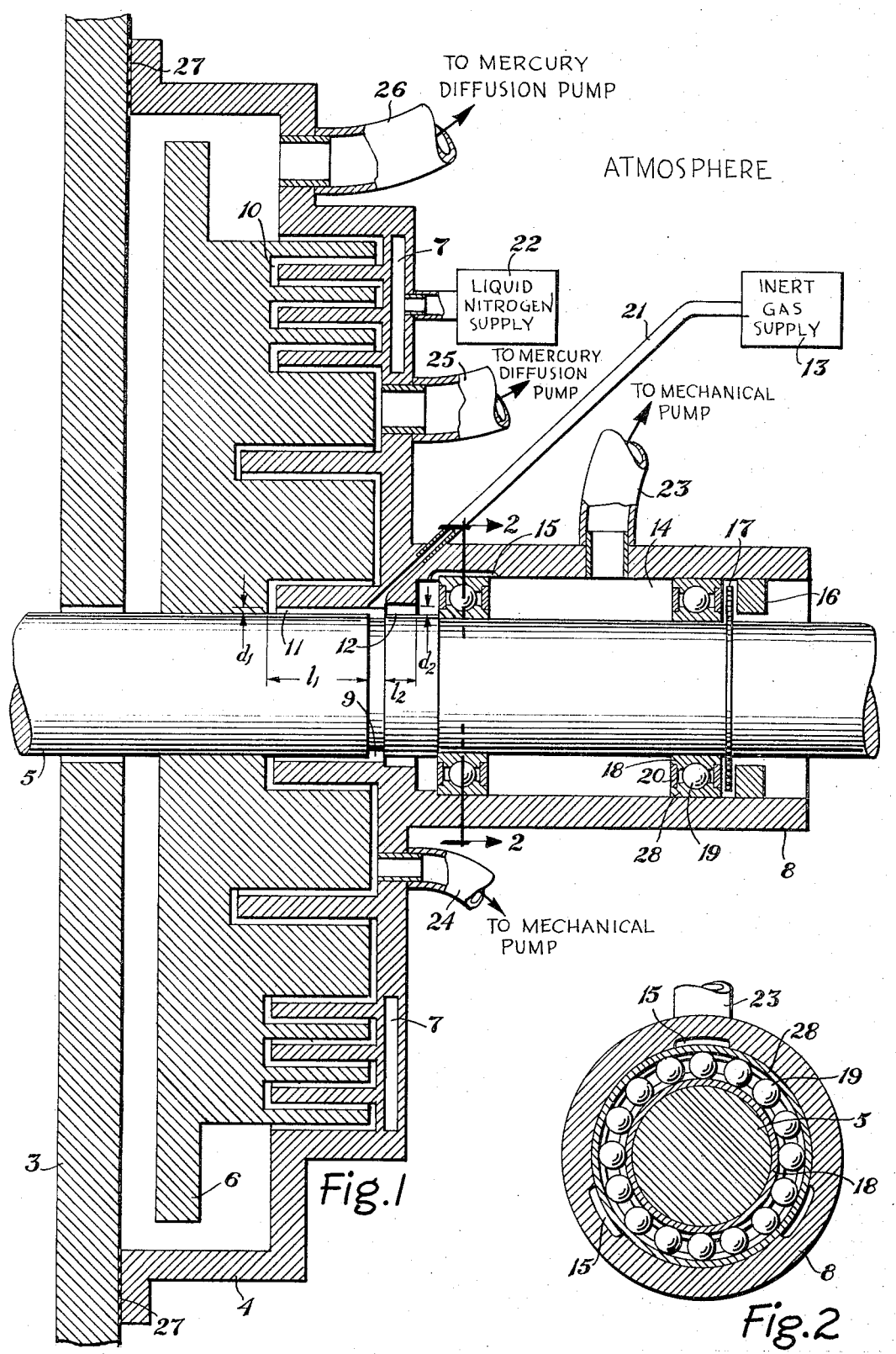

3,347,604
HIGH VACUUM ROTARY SEAL AND
BEARING COMBINATION
Joseph E. Lavelle, Wellesley, William J. Courtney, Natick, and Alec S. Denholm, Lexington, Mass., assignors to Ion Physics Corporation, Burlington, Mass., a corporation of Delaware
Filed Feb. 19, 1964, Ser. No. 345,983
3 Claims. (Cl. 308—36.3)

The invention disclosed and claimed herein relates to high vacuum systems and has as its object the provision of improved apparatus adapted to overcome various limitations inherent in prior art rotary vacuum seals.

There are many instances in which motion, linear and rotational, must be initiated and maintained within a vacuum. Electrostatic generators, gyroscopes, isotopes separators and dynamic particle accelerators are typical devices which include some sort of rotating system within a high vacuum environment. A rotary drive can be provided in a vacuum with minimum contamination to the system by means of "canned" electric motors, bellows, wobble plates, and magnetically or electrostatically coupled drives. These methods, however, have both speed and power limitations. Furthermore, such methods require that shaft support bearings be located within the vacuum system; thus, giving rise to the additional problems of bearing lubrication and the vacuum contamination resulting therefrom.

An alternative method of providing a rotary drive within a vacuum comprehends a drive shaft which passes through the vacuum boundary. This approach is not subject to speed and power limitations. It also permits the location shaft support bearings outside of the vacuum system. On the other hand, a significant disadvantage, that of leakage through the narrow slit between the rotating shaft and the stationary vacuum chamber wall, has in the past rendered such a method impractical or ineffective for applications requiring high vacuums.

Accordingly, it is a principal object of this invention to provide a high vacuum rotary seal adapted to effect minimum leakage between a vacuum boundary and a rotatable shaft penetrating therethrough.

It is another object of this invention to provide a new and improved high vacuum rotary seal of the so-called controlled leak type.

Yet, another object of this invention is to provide a controlled leak high vacuum rotary seal into which a curtain of contaminant free inert gas is injected, whereby support bearing lubricant contaminants are excluded from the vacuum system.

These, together with other objects and features of the invention, will be more readily understood from the following detailed description of a presently preferred embodiment thereof taken in conjunction with the accompanying drawing wherein:

FIGURE 1 is a sectional view of a high vacuum rotary seal incorporating the principles of the invention; and FIGURE 2 is a sectional view of FIGURE 1 taken at 2—2.

In general, the invention comprehends a close running seal into which an inert gas is injected. That is, a length of the rotatable shaft is enclosed in and spaced from a coaxially disposed sheath support member. The sheath support member is hermetically sealed to the vacuum boundary and shaft support bearings disposed therein maintain the shaft in position to provide a narrow annular gap between sheath and shaft. The geometry of the gap is such that the inert gas which is injected between the support bearings and the vacuum boundary has a tendency to flow toward the bearings. The gap geometry, in combination with the particular pressure at which the inert gas is injected, is further adapted to effect gas flow in the so-called slip flow region. Finally, the portion of the annular gap residing between the point of gas injection and the support bearings is evacuated by apparatus suitable to remove inert gas and other contaminants such as bearing lubricants which migrate toward the high vacuum system. There is thus provided a curtain of inert gas which sweeps contaminants such as vaporized bearing lubricants away from the vacuum system.

By way of illustrating the invention, reference is made to FIGURES 1 and 2; wherein, a high vacuum rotary seal employing the principles of the invention is illustrated. Rotatable shaft 5 penetrates vacuum chamber wall 3 and is supported within shaft housing member 4 by shaft support bearings. The vacuum chamber, of which wall 3 is but a portion, is the vacuum system referred to throughout the specification and comprises an evacuated region beyond wall 3 opposite to housing 4. This vacuum may be created by any suitable means known to those skilled in the art and is not shown in detail because it forms no part of the present invention. The vacuum created in this chamber, however, extends past the shaft 5 into the interior of housing 4 up to and into labyrinth 10. Housing member 4 is hermetically sealed to wall 3 by means of stationary vacuum seal 27. The shaft support bearings consist of inner race members 18 attached to shaft 5, outer race members 28 attached to extension 8 of housing 4, balls 19, and seal members 20. The seal members 20 operate to contain the bearing lubricant and prevent rapid dissipation thereof from the flow of inert gas which envelops the bearings. Shaft plate member 6 is attached to shaft 5 and cooperates with housing member 4 to establish labyrinth 10 therebetween. A cold trap is established by means of annular volume 7 which is contiguous to a portion of labyrinth 10 and is filled with liquid nitrogen from liquid nitrogen supply 22. Labyrinth 10 is pumped at various stages through conduits 24, 25 and 26. These pumps may be auxiliary to the means which created the vacuum in the chamber and are used only to clear labyrinth 10 of any material which may flow into labyrinth 10 from region 11. A face seal which comprises annular flange 17 attached to shaft 5 and annular ring member 16 attached to extension 8 effects the initial atmosphere/vacuum boundary. The volume 14 within which the shaft support bearings reside is pumped by a mechanical forepump via conduit 23.

The major problem encountered in a rotary vacuum seal of the type comprehended herein is that atmospheric contaminants and evaporated bearing lubricants migrate into the vacuum system. Although the face seal, labyrinth, cold trap and various pumping stages to a large extent remove such contaminants they are not effective when very high vacuums are required. Cold traps are well known to the prior art and commonly are used in vacuum systems to remove unwanted vapors of oil and the like when present in small quantities. These cold traps operate by cooling a surface, across which the unwanted vapor must pass, to a temperature below the condensation or freezing temperature of the unwanted vapor. The amount of vapor so condensed is dependent on the amount of cooled surface area exposed to the vapor, the temperature of the surface and the condensation level of the vapor. In the present invention cold trap 7 is used to condense in the labyrinth any miscellaneous vapors that may leak into labyrinth 10. This is so largely because of the nature of the evaporated lubricant molecules which are particularly difficult to remove from the system. The present invention effectively overcomes this problem by means of the particular geometery of the shaft-housing region between the labyrinth and volume 14 and by means of a supply of inert gas, such as nitrogen, injected therein. Of particular significance, are the geometries of the annular volumes 11 and 12 which reside between shaft 5 and housing 4. Inert gas is injected at a point between volumes 11 and 12 through conduit 21 from inert gas supply 13. A groove 9 is provided in shaft 5 contiguous to the point of gas injection to insure uniform distribution of the gas. The thickness $d1$ of volume 11 is less than the thickness $d2$ of volume 12. This arrangement has the effect of causing the greater portion of the injected inert gas to flow toward the shaft bearings and not toward the labyrinth and the vacuum system. Apertures 15 are provided to accommodate the flow of gas into volume 14 wherefrom it is removed by the mechanical forepump. There is thus established a moving curtain of inert gas which envelopes the shaft bearings and carries evaporated bearing lubricants and other contaminants out of the vacuum system.

The efficiency of the rotary seal comprehended by the invention can be optimized by proper selection of dimensions for any given application. For instance, the dimension $d1$ should always be made as small as possible consistent with machine size and mechanical strength requirements. On the other hand, the dimension $d2$ should be made as large as possible consistent with economy of operation. That is, if the $d2$ gap is inordinately large, the amount of gas required and the mechanical fore pump capacity would be so great as to be economically prohibitive. The dimensions $l_1$ and $l_2$ should be as long as other considerations, such as economy and mechanical problems permit. The greater the dimension $l_1$ is the higher the impedance to gas flow. The distance $l_2$ must be at least long enough to allow flow profile development.

In addition to the above-enumerated considerations, it is also important that the curtain of inert gas reside within the proper flow region. The flow regions are determined from Knudsen's number and may be classified as molecular flow, transitional flow, slip flow, or laminar flow. Knudsen's number relates to the pressure of the gas and to the geometry of its flow path and its inverse is represented by the expression $$X = \frac{a(1+k)Z}{(1-k^2)^2}$$

$$Z = 1 - k^4 + \frac{(1-k^2)^2}{\ln k}$$

$k = b/a$
$a =$ the outer radius of annular volume 12;
$\ln k =$ the natural log of K, and
$b =$ the inner radius of annular volume 12.

Molecular flow occurs when the pressure is such that flow is governed by molecule to container collisions instead of intermolecular collisions and is represented by the condition $$\frac{X}{\lambda} < 0.1$$

where $\lambda =$ mean free path of gas under consideration.

Transitional flow is the flow region between molecular and slip flow and is represented by the condition $$0.1 < \frac{X}{\lambda} < 10$$

Slip flows occurs when the pressure is such that the velocity of the molecular layer at the container wall is not zero (as in laminar flow) but is proportional to the gradient of velocity normal to the wall. In effect, slip flow increases the flow that would be determined from laminar flow predictions. The conductance of slip flow is pressure dependent. Slip flow is represented by the condition $$10 < \frac{X}{\lambda} < 100$$

Laminar flow exists when the flow is such that collisions between the molecules and hence, gas, viscosity, determines the flow. The conductance is pressure dependent and requires a length to small dimension ratio of about 40 to allow fully developed parallel flow stream lines. Laminar flow is represented by the condition $$100 < \frac{X}{\lambda}$$

To be effective, the curtain of inert gas must be in the high transition region as it flows against the contaminant molecule. It is desired that it be in the flow region represented by an inverse Knudsen's number in the $$0.1 < \frac{X}{\lambda} < 10$$

range.

The inert gas curtain can be maintained in the desired flow region for any given rotary seal simply by adjusting the gas pressure.

While the invention has been described with reference to one presently preferred embodiment, it is to be understood that the words which have been used are words of description rather than of limitation and that changes within the purview of the appended claims may be made without departing from the true scope and spirit of the invention in its broader aspects.

What is claimed is:

1. In combination, a rotary seal, a rotatable shaft, said rotary seal comprising a housing member encompassing a length of said shaft, a plurality of axially extending rings on said housing concentric with said shaft, a shaft plate affixed to said shaft having a plurality of axially extending concentric rings adapted to mate with the rings affixed to the housing to define a labyrinth there between, an extension on said housing in axial opposition to the rings on the housing, said extension encompassing a length of said rotatable shaft, a pair of spaced apart support bearings disposed in said extension, a source containing inert gas, means for directing said gas from said source around said shaft away from said labyrinth and towards said bearings into said extension to immerse said bearings into a flow of said gas, said means including an annular groove on said shaft and stepped annular regions in said housing around said shaft and means for removing said gas from said extension, said removal means being disposed in said extension between said spaced apart bearings thereby preventing vapors from said bearings from entering said labyrinth.

2. In combination, a rotatable shaft, a seal assembly for said shaft and passing through a wall of a highly evacuated chamber comprising a housing member hermetically sealed to said wall and encompassing a length of said shaft, a plurality of rings coaxial with said shaft fixed to the interior of said housing and axially extending towards the wall of the chamber, a shaft plate fixed to said shaft and adapted to rotate therewith, said plate carrying coaxial rings adapted to mate with the coaxial rings fixed to the housing to define a labyrinth therebetween, means for producing a vacuum in said labyrinth, an extension on said housing coaxial with said shaft and extending in axial opposition to the rings fixed to said housing, a pair of spaced apart support bearings disposed in said extension for supporting said shaft, a source of inert gas, means for directing gas from said source through said extension in a direction away from said labyrinth and towards said bearings to immerse said bearings in a flow of said gas, said directing means comprising an annular groove provided in said shaft, a gas conduit passing into the interior of said housing in proximity to said groove, a pair of stepped annular regions in said housing surrounding said shaft, said groove being located between said regions, the region farthest from the bearings having a thickness less than the thickness of the region closest to the bearings and means for removing said gas from said extension, said removal means being disposed in said extension between said spaced apart bearings.

3. The seal of claim 2 wherein said pair of stepped annular regions have a dimensional ratio such that the flow of gas is transitional as represented by a Knudsen's member in the $$0.1 < \frac{X}{\lambda} < 10$$

range.

References Cited

UNITED STATES PATENTS

| | | | |
|---|---|---|---|
| 1,258,218 | 3/1918 | Hicks | 308—36.3 X |
| 1,463,018 | 7/1923 | Jungren | 277—53 |
| 2,125,446 | 8/1938 | Hurtt | 308—36.3 |
| 2,266,107 | 12/1941 | Waterfill | 308—36.3 X |
| 2,650,116 | 8/1953 | Cuny | 308—36.3 X |
| 2,660,367 | 11/1953 | Ehlinger | 277—53 X |
| 2,714,045 | 7/1955 | Jimenson | 308—36.3 |
| 2,911,919 | 11/1959 | Tucker. | |
| 2,949,321 | 8/1960 | Tracy. | |
| 3,039,779 | 6/1962 | Laird | 277—70 X |
| 3,071,384 | 1/1963 | Friberg | 277—53 X |
| 3,090,654 | 5/1963 | Wald et al. | 308—36.3 |

MARTIN P. SCHWADRON, *Primary Examiner.*

DAVID J. WILLIAMOWSKY,
 EDGAR W. GEOGHEGAN, *Examiners.*

R. F. HESS, *Assistant Examiner.*